United States Patent [19]
Moen

[11] 4,386,650
[45] Jun. 7, 1983

[54] TEMPERATURE CONTROL SYSTEM

[75] Inventor: Walter K. Moen, Newport Beach, Calif.

[73] Assignee: Rockwell International Corporation, El Segundo, Calif.

[21] Appl. No.: 655,331

[22] Filed: Feb. 5, 1976

[51] Int. Cl.³ .................... F28F 27/00; G05D 23/00
[52] U.S. Cl. ........................... 165/12; 165/30; 165/35; 165/61; 62/50; 219/300; 34/225
[58] Field of Search .................... 219/300; 165/35, 12, 165/30, 34, 36, 61; 34/225, 233; 62/50

[56] References Cited

U.S. PATENT DOCUMENTS

| | | | |
|---|---|---|---|
| 870,577 | 11/1907 | Naumer | 219/300 |
| 2,004,843 | 6/1935 | Wilkes | 165/12 |
| 2,751,152 | 6/1956 | Ellenberger | 165/35 |
| 2,825,791 | 3/1958 | Jackson | 219/300 |
| 3,097,517 | 7/1963 | Bowen | 219/300 |
| 3,111,023 | 11/1963 | Overfield | 219/300 |
| 3,186,480 | 6/1965 | Sauer | 165/36 |
| 3,213,929 | 10/1965 | Marshall | 165/35 |
| 3,350,890 | 11/1967 | Cope | 62/50 |
| 3,470,624 | 10/1969 | Plotkowiak | 165/61 |
| 3,518,410 | 6/1970 | Dillarstone | 219/300 |
| 3,531,874 | 7/1970 | Sukup | 34/225 |
| 3,536,132 | 10/1970 | Pecoraro | 165/30 |
| 3,835,293 | 9/1974 | McAlister | 219/300 |
| 3,848,342 | 11/1974 | Bartles | 165/12 |
| 3,851,146 | 11/1974 | Bennett | 219/300 |

Primary Examiner—Samuel Scott
Assistant Examiner—Margaret A. Focarino
Attorney, Agent, or Firm—Charles T. Silberberg

[57] ABSTRACT

A temperature control system is disclosed which supplies a fluid which acts as a temperature effecting agent for the system. The fluid is conveyed through the system with a temperature control means regulating the temperature of the fluid and a fluid control means regulating flow of the fluid through the system. The temperature control means includes a helix of electrically resistant tubing which the fluid passes through. Optimally, the helix is responsive to the application of electrical current such that temperature of the fluid passing through the helix is controlled as a function of the applied current. Preferably, a distribution network forms part of the system and uniformly distributes the fluid in a desired area and/or around an object. The fluid control means can also include a diverting means for diverting fluid not at a desired temperature from the system and an additional means to vary the temperature of the fluid distributed by the system.

18 Claims, 4 Drawing Figures

TEMPERATURE CONTROL SYSTEM

BACKGROUND OF THE INVENTION

The invention herein described was made in the course of or under a contract or subcontract thereunder, (or grant) with The Department of the Air Force.

This invention relates generally to a temperature control system and more particularly to apparatus for controlling the temperature of a desired area by application of a heating or cooling fluid to the area. The fluid used is preferably a gas (when applied to the area). The present system includes a control for the flow of the fluid and a means for regulating temperature of the fluid.

Other mechanisms have been devised for regulating the temperature of a desired area or for supplying a temperature treated fluid. For example, U.S. Pat. No. 3,652,825 to Layton discloses a process vessel for treating parts in a work zone with heated inert gas, the inert gas being heated by a coil of tubing which the inert gas passes through, the tubing being heated by passing current therethrough. U.S. Pat. No. 2,287,974 to Cohen discloses a heating apparatus where pressurized fluid flows through a coil tubular heater and is sprayed through a nozzle depending upon the position of a valve. Pat. No. 3,596,056 to Dillarstone discloses a shaving cream dispenser where shaving cream is released from a pressurized container by the opening of a valve and heated by a tubular coil heater before being dispensed. A temperature control system for use in constant temperature baths that utilizes a combined heater cooler is disclosed in U.S. Pat. No. 3,680,630 to Watts.

However, none of these prior art devices provide for the application to a desired area or a part in a uniform manner, a highly accurate temperature controlled fluid. Additionally, the present invention provides the advantages of being applicable for heating and cooling, applying only fluid at a predetermined temperature to the desired area or object, such that overshoot of the desired temperature of the fluid is prevented and a sharp temperature ramp from the initial temperature of the area and/or object to the desired temperature is accomplished.

SUMMARY OF THE INVENTION

It is, therefore, an object of the present invention to provide a temperature control system using a fluid as a temperature effecting agent which is supplied to an object or area such that the fluid applied will have a precise temperature.

It is another object of the present invention to provide a temperature control system having a fluid as a temperature effecting agent to heat or cool an object or area when applied thereto.

It is yet another object of the present invention to provide a temperature control system using a fluid as the temperature effecting agent where the fluid is applied to an object or area in a highly uniform manner.

It is still another object of the present invention to provide a temperature control system using a fluid as a temperature effecting agent where the temperature of the fluid applied to an object or area is not subject to overshoot conditions and is only applied at a predetermined temperature.

Briefly, in accordance with the invention, there is provided a temperature control system using a fluid as a temperature effecting agent. A fluid conveying means conveys fluid from a supply means to the system outlet. A temperature control means regulates temperature of the fluid at the outlet. The temperature control means includes a helix of electrically resistant tubing which is connected to the fluid conveying means such that fluid passes through the helix. A fluid control means regulates flow of the fluid through the fluid conveying means.

In one form of the invention, a diverting means diverts the fluid for a predetermined time from the fluid conveying means that passes through the helix in order to allow only the fluid at a desired temperature to be conveyed to the outlet. In another form of the invention, the fluid at the outlet can be selectively intermingled with fluid which has not passed through the helix to vary the temperature of the fluid at the outlet. In still another form of the invention, a distribution network would be connected to the system outlet such that fluid would pass from the outlet into the distribution network, with the distribution network uniformly distributing the fluid in a desired area, or equivalently around an object.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
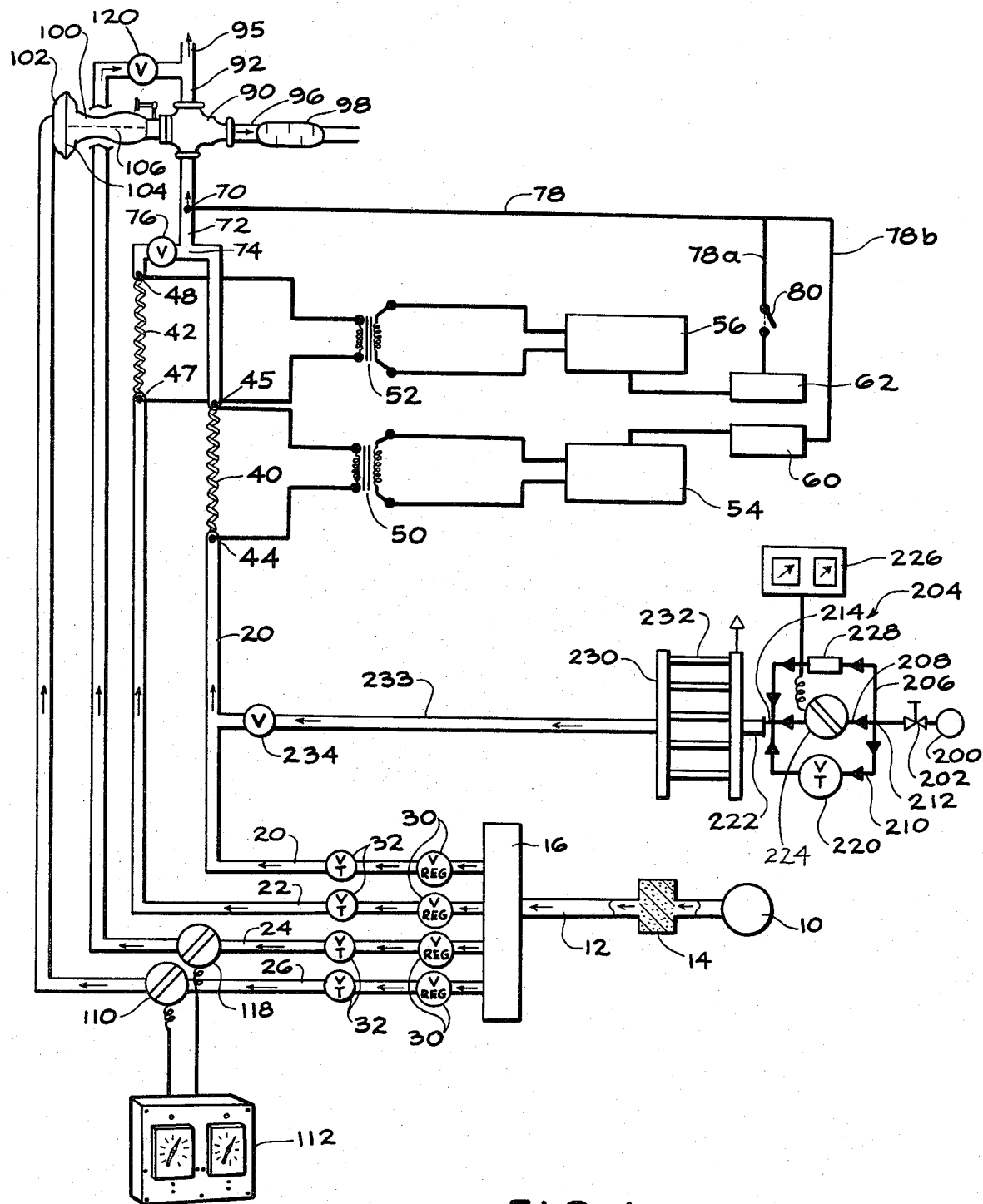
FIG. 1 is a diagram of the temperature control system of the present invention.

Turning first to FIG. 1, there is shown a diagramatic illustration of the present temperature control system. The present system uses a fluid as the temperature effecting agent. By this is meant that a fluid is supplied to the system at an inlet temperature, is acted upon by the system so that upon exiting the temperature control system, it is at a desired temperature and can then be applied to a desired area or object to change or maintain the temperature thereof. Accordingly, pressurized fluid is supplied to the system in any suitable manner as from a tank 10. The fluid used is preferably a gas. However, it can be in the form of a liquid which optimally would be converted to a gas when heated. Preferred fluids are pressurized air from an industrial plant or commercial bottled gas, which optimally would be an inert gas. The pressurized fluid passes from tank 10 through a line 12 and a filter 14 to a manifold 16. Filter 14 filters impurities from the fluid passing therethrough in order to prevent clogging within system elements and to insure uniform and accurate temperature of the fluid.

Manifold 16 distributes the pressurized fluid through four separate lines 20, 22, 24, and 26. Each of these lines has a pressure regulator 30 and a valve 32 therein. Regulators 30 control the pressure in each separate line. Valves 32 are preferably of an orifice type such that they can meter the fluid to be passed therethrough in each individual line. Thus, the flow of the fluid in each line can be accurately controlled by controlling fluid pressure with pressure regulators 30 and metering the flow with orifice valves 32.

Depending upon the settings of valves 32 and pressure regulators 30, fluid flows through lines 20 and 22 to tubular helix heaters 40 and 42 which are connected in fluid conveying relation to lines 20 and 22, respectively. Thus, all fluid passing through valve 32 in line 20 passes through heater 40 and all fluid passing through valve 32 in line 22 passes through heater 42.

A line 72 is connected at a junction 74 of lines 20 and 22. Fluid passing through heater 40 is conveyed through junction 74 to line 72. Depending on whether valve 76 is open or closed, fluid passing from heater 42 would also be conveyed through junction 74 into line 72.

Helical tubular heaters 40 and 42 are made of electrical resistance metal so as to constitute an electrical heating element for fluid passing therethrough. Helical heaters 40 and 42 which are preferably made of precleaned stainless steel tubing and are heated by passing current therethrough, are capable of heating the fluid passing therethrough to about 1600° F. maximum. This is accomplished by attaching electrodes 44 and 45 to the input and output ends of helical heater 40 and electrodes 47 and 48 to the input and output ends of helical heater 42. These electrodes are connected to the output of transformers 50 and 52, respectively. Transformers 50 and 52 are preferably 480 to 50 volt alternating current step-down transformers. These provide a low voltage and high current to the helical heaters. Because of the low voltage and high current, helical heaters 40 and 42 can be used safely. Additionally, a highly electrically resistant metal for helical heaters 40 and 42 which is normally expensive is not required to provide the desired heating capability so that cost of the system is minimized.

The current applied by transformers 50 and 52 are controlled by solid state power units 54 and 56, respectively. Such power units can be in the form of a powerstat or saturable core reactor. Controllers 60 and 62 control the on-off time of power units 54 and 56, respectively. Applicant has found that controllers sold under the trade name Electromax by Leeds and Northrup have been especially suitable for this described function.

Figure 2:
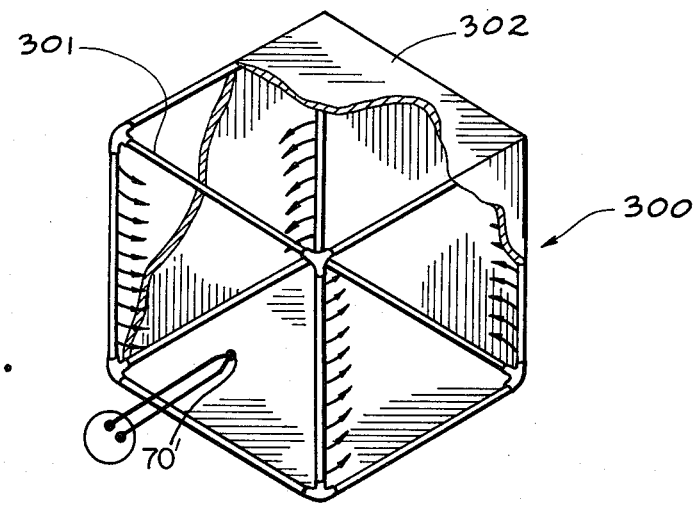
FIG. 2 is a detail perspective view with portions removed to aid illustration of a form of distribution network which can be utilized with the present invention.

A temperature sensor 70, which is preferably a thermocouple, is disposed on line 72, or alternately in the area where the fluid is to be distributed (as illustrated in FIG. 2 where the thermocouple is designated 70'), and is connected by electrical line 78 which breaks off into the electrical lines 78a and 78b to controllers 62 and 60, respectively. Depending upon the temperature sensed by temperature sensor 70, controllers 60 and 62 will increase or decrease the power required to provide a predetermined temperature of fluid in line 72 by varying the on-off time of power units 54 and 56 respectively thereby varying the current applied to heaters 40 and 42 by transformers 50 and 52.

The use of two lines 20 and 22 and heaters 40 and 42 provides increased flexibility to the system. In this regard, two small heaters can be used to heat through the two lines the same volume of fluid as one larger heater, with the larger heater not being as safe because of it requiring a higher current to heat the same volume of fluid as the two smaller heaters. Also, it may be desired to have fluid in line 22 heated to a different temperature than the fluid in line 20 for intermingling in line 72. Or, it may be desired to simply use one line, such as line 20, where a lesser volume of fluid is desired to be controlled by the system for application to an object of area. When, for example, only line 20 is to supply fluid to line 72, valve 32 of line 22 would preferably close to prevent flow of fluid in line 22 through heater 42, while valve 32 of line 20 would be opened a desired amount to meter flow through line 20 and heater 40 to line 72. Valve 76 would be closed to prevent fluid flow from line 20 to line 22. An optional switch 80 could be provided in line 78a to prevent actuation of controller 62 and the connected power unit 56, transformer 52, and heater 42. Equivalently, these devices could simply by turned off. Thus, temperature sensor 70 would through line 78 and 78b actuate the controller 60 to vary on-off time of power unit 54 such that the current produced by transformer 50 would be regulated for application to heater 40 to create the desired amount of heat applied to fluid passing through heater 40.

In order to have the temperature control system produce a sharp heating ramp (where the object or area to be heated has its temperature raised from its initial temperature to the desired temperature rapidly during application of the heating fluid) to only allow fluid at a desired temperature to be conveyed to the system outlet 95 where it can be applied to the desired area and/or object, a diverting means is provided. This means diverts the fluid from reaching the system outlet 95 by dumping it overboard for a predetermined time until the fluid at a desired temperature. A fast acting valve 90 can be positioned to direct fluid from line 72 through line 92 to outlet 95 or to direct fluid from line 72 through line 96. Line 96 dumps fluid passing therethrough overboard outside the system. Preferably, a muffler 98 is connected in line 96 to reduce the sound of the dumped fluid.

The position of valve 90 is controlled by a fluid pressure responsive mechanism 100. Mechanism 100 has a chamber 102 of which one side is made up by a diaphram 104. A suitable linkage mechanism 106 shown by the broken lines is connected to diaphram 104 and valve 90. Chamber 102 is connected to fluid line 26. Fluid pressure conveyed through line 26 to chamber 102 is controlled by orifice valve 32 and pressure regulator 30 in line 26, and solenoid valve 110. Valve 110 is preferably controlled by a timing mechanism illustrated at 112. The time it takes for fluid to reach a desired temperature in line 72 as sensed by the temperature sensor 70 from its initial supply temperature is normally known. Accordingly, valve 110 could be actuated by timer 112 to allow fluid to flow through line 26 (at sufficient pressure and quantity as determined by valve 32 and pressure regulator 30) for a specified time to chamber 102 to position diaphram 104 and the connected linkage 106 such that valve 90 would prevent (divert) fluid from flowing from line 92 and outlet 95 while simultaneously channeling the fluid from line 72 through line 96 and muffler 98 overboard. Once the specified time had elapsed, the temperature in line 72 would be at the desired level and valve 110 would be deactivated thereby preventing flow of fluid from line 26 to chamber 102 by diaphram 104 and linkage 106 forcing valve 90 to its other position where flow of fluid is channeled from line 72 to line 92 rather than line 96. Alternatively, instead of using a timing device 112, valve 110 could be controlled by being connected to temperature sensor 70 where the position of valve 110 would depend upon the temperature indicated by sensor 70.

In order to prevent overshoot conditions, where the temperature of the fluid being heated overshoots the desired temperature prior to stabilizing, fluid line 24 is provided. Line 24 connects with line 92 beyond valve 90 prior to outlet 95. As such, fluid flowing through line 24 passing into line 92 will intermingle with the fluid in line 92 prior to the fluid in line 92 passing through outlet 95. Control of the fluid in line 24 is provided by pressure regulator 30 and metering valve 32 in line 24 and valves 118 and 120. Valve 118 is preferably actuated by timing mechanism 112. Valve 118 is normally closed and prevents flow of fluid in line 24 from being conveyed to line 92. However, at a specified time when the temperature of fluid in line 92 is or would become above the desired temperature due to overshoot conditions, valve 118 would be actuated to an open position by timing mechanism 112 to allow flow of fluid from line 24 to be conveyed into line 92 to intermingle with the fluid in line 92. As the fluid in line 24 is preferably not heated and is therefore at the initial supply temperature, it will have a cooling effect on the heated fluid in line 92 due to the intermingling. Timing mechanism 112 would keep the valve 118 actuated for a specified amount of time until overshoot conditions of the fluid flowing from line 72 to line 92 are eliminated. Valve 32 and pressure regulator 30 in line 24 control the amount and pressure of the fluid to be intermingled with the fluid in line 92 which is necessary to eliminate the overshoot deviation from the desired temperature. Alternatively, valve 118 could be connected to temperature sensor 70 to control actuation depending upon the temperature sensed. Valve 120 prevents backflow from line 92 to line 24.

The present temperature control system also provides for directing a cooling fluid to a desired area or object to reduce the temperature thereof. The system has a capability of providing cooling fluid in the range of from about −200° F. to about 70° F. A supply tank 200 contains a cryogenic liquid such as liquid nitrogen or carbon dioxide. A valve 202 meters the supply fluid to a tubular network generally indicated at 204 consisting of three fluid lines 206, 208, and 210 which are interconnected at junctions 212 and 214. Line 210 is connected to an adjustable orifice cryogenic valve 220 for metering a precise amount of fluid through line 210 to junction 214 and connected line 222. A cryogenic solenoid valve 224 is connected in line 208. Solenoid valve 224 is controlled by a timer 226. A fixed orifice by-pass 228 is connected in line 206 to prevent pressure build-up between closed valves. Tubular network 204 provides flexibility to the system in that a metered amount of fluid can be provided (line 210), or fluid can be provided for a specified amount of time (line 208), or fluid can be provided in a certain amount and increased at specified times (as by using lines 208 and 210).

Fluid passing through junction 214 flows through a line 222 into an evaporation manifold 230. Evaporation manifold 230 converts the cryogenic liquid to a low temperature gas by passing it through the various tubes 232 of evaporation manifold 230 which are exposed to ambient temperature air. The low temperature gas passes from evaporation manifold 230 into a line 233 which preferably connects with line 20. A valve 234 prevents a backflow of the low temperature gas and also prevents flow of fluid from line 20 into line 233 when the temperature control system is used as a heater and the fluid is supplied from tank 10. When acting as a cooling device, the system would have valve 32 of line 20 closed so that flow of fluid from supply tank 10 would not pass valve 32 and intermingle with the fluid from line 233. Valve 32 also prevents backflow of fluid from line 233 to line 20 in the direction of distribution manifold 16. Thus, cooling fluid will flow from line 233 up-stream into line 20, through heater 40, into line 72, through valve 90, into line 92 and out through outlet 95. For the cooling operation, valves 76 and 120 would normally be closed, although if desired, valve 120 could be opened along with valves 118 and 32 in line 24 to allow intermingling of ambient temperature fluid with the cooling fluid. Heater 40 can be used in the manner previously described to heat the cooling fluid to a specific increased temperature if necessary. Valve 90 could also be operated as previously described if desired to divert the flow of cooling fluid overboard for a certain period of time.

The present system also contemplates uniformly distributing the heating or cooling fluid from the system that passes through outlet 95 within a desired area and/or around desired objects. Referred now to FIG. 2, there is shown one example of a distribution network generally indicated at 300 for uniformly distributing the heating or cooling fluid passing from outlet 95. Network 300 is made up of a series of tubes 301 shaped and connected to define the desired enclosure. Depending upon the shape chosen, an integral tubular network can be used. The tubular network supports insulation 302 which encloses the desired area. Tubes 301 have a plurality of small orifices (not shown), usually about 0.040 inches in diameter, provided therein. Distribution network 300 is connected to outlet 95 through any suitable conduit means such that fluid, preferably a gas, will pass from outlet 95 into tubes 301 of distribution network 300. The heating or cooling gas eminates from the orifices in tubes 301 in an equal fashion and flows around any object which may be in the desired area. By virtue of this equally distributed fluid flow into the desired enclosed area, the temperature of the area (and/or object) is uniformly converted to a desired temperature by convection due to the intermingling of the fluid distributed from tubes 301 and also by virtue of radiation furnished by the tubes 301 which act as a radiant source due to the flow of the fluid therein (when a heating fluid is used).

Figure 3:
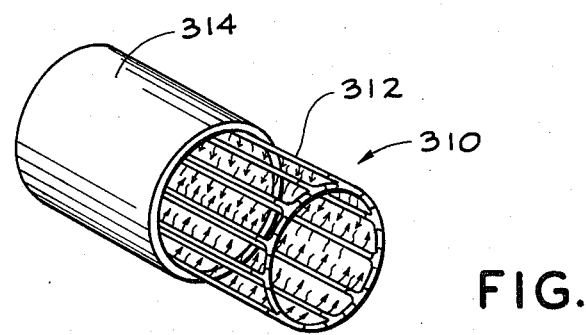
FIG. 3 is a detail perspective view with portions removed of another form of distribution network which can be utilized with the present system.

FIG. 3 illustrates another type of distribution network generally indicated at 310 having distribution tubes 312 and insulation enclosure 314.

Figure 4:
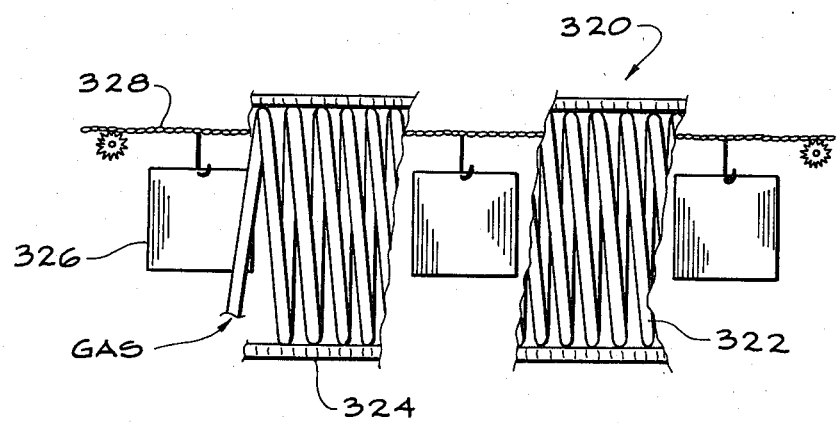
FIG. 4 is a detail cross-sectional view with portions removed of another form of distribution network which can be utilized with the present temperature control system also illustrating the conveying of objects through the illustrated distribution network.

FIG. 4 illustrates another form of distribution network generally indicated at 320 having distribution tubes 322 and insulated enclosure 324. This embodiment also allows for the treating of objects 326 which are passed through the treating area, i.e., between the distribution tubes 322, by a conveyor belt 328.

Thus, it is apparent that there has been provided, in accordance with the invention, a temperature control system that fully satisfies the objectives, aims, and advantages set forth above. While the invention has been described in conjunction with the specific embodiments thereof, it is evident that many alternatives, modifications, and variations, will be apparent to those skilled in the art in light of the foregoing description. Accordingly, it is intended to embrace all such alternatives, modifications, and the variations as fall within the spirit and scope of the appended claims.

What is claimed is:

1. A temperature control system comprising:
   supply means for supplying fluid, the fluid acting as the temperature effecting agent for the temperature control system;
   an outlet;
   fluid conveying means for conveying the fluid from the supply means to said outlet;
   temperature control means for regulating temperature of the fluid at said outlet, said temperature control means including a helix of electrically resistant tubing, said helix being connected to said fluid conveying means in fluid conveying relation such that the fluid being conveyed from said supply means to said outlet passes through said helix while being conveyed to said outlet; and
   fluid control means for regulating flow of the fluid through said fluid conveying means, said fluid control means including a diverting means responsive to said temperature control means for diverting for a predetermined time the fluid from said fluid conveying means which passes through said helix to prevent the fluid diverted from being conveyed to said outlet in order to allow only the fluid at a desired temperature to be conveyed to said outlet.

2. The system of claim 1 also including a distribution network connected to said outlet in fluid conveying relation such that the fluid passes from said outlet into said distribution network, said distribution network governing efflux of the fluid from the system such that the fluid is uniformly distributed the fluid in a desired area.

3. The system of claim 1 wherein said diverting means includes: a valve, a valve control means for actuating said valve to divert the fluid from said fluid conveying means which passes through said helix, said valve control means being responsive to application of the fluid, and application means for selectively applying the fluid to said valve control means.

4. A temperature control system comprising:
   supply means for supplying fluid, the fluid acting as the temperature effecting agent for the temperature control system;
   an outlet;
   first fluid conveying means for conveying the fluid from the supply means to said outlet;
   temperature control means for regulating temperature of the fluid at said outlet, said temperature control means including a helix of electrically resistant tubing, said helix being connected to said first fluid conveying means in fluid conveying relation such that the fluid being conveyed from said supply means to said outlet through said first fluid conveying means passes through said helix while being conveyed to said outlet;
   first fluid control means for regulating flow of the fluid through said first fluid conveying means;
   second fluid conveying means for conveying the fluid from the supply means to said outlet, the fluid from said second fluid conveying means that reaches said outlet being intermingled with the fluid from said first fluid conveying means reaching said outlet; and
   second fluid control means responsive to said temperature control means for regulating flow of the fluid through said second fluid conveying means in order to vary the temperature of the fluid reaching said outlet.

5. The system of claim 4 also including a distribution network connected to said outlet in fluid conveying relation such that the fluid passes from said outlet into said distribution network, said distribution network uniformly distributing the fluid in a desired area.

6. The system of claim 4 wherein said first fluid control means also includes a diverting means responsive to said temperature control means for diverting for a predetermined time the fluid from said first fluid conveying means which passes through said helix to prevent the fluid diverted from being conveyed to said outlet in order to allow only the fluid at a desired temperature to be conveyed to said outlet by said first fluid conveying means.

7. The system of claim 6 also including a distribution network connected to said outlet in fluid conveying relation such that the fluid passes from said outlet into said distribution network, said distribution network governing efflux of the fluid from the system such that the fluid is uniformly distributed the fluid in a desired area.

8. The system of claim 7 wherein said distribution network includes at least one tube, said tube having a plurality of apertures for efflux of the fluid from the system.

9. The system of claim 8 wherein said at least one tube defines the desired area where the fluid is uniformly distributed, and wherein said distribution network provides for heating of the desired area by convection and radiation.

10. The system of claim 9 wherein at least one object is to be heated within the desired area, said at least one object being heated by being conveyed through the desired area.

11. The system of claim 8 wherein the fluid is used to cool the desired area and the fluid is a cryogenic fluid.

12. The system of claim 9 wherein said first fluid control means includes a means for metering the flow of fluid through said first fluid conveying means, and said second fluid control means includes a means for metering the flow of fluid through said second fluid conveying means.

13. The system of claim 8 wherein said diverting means includes: a valve, a valve control means for actuating said valve to divert the fluid from said fluid conveying means which passes through said helix, said valve control means being responsive to application of the fluid, and application means for selectively applying the fluid to said valve control means.

14. The system of claim 13 wherein said temperature control means includes a timing means, and wherein said application means includes a metering means to meter the flow of fluid to said valve control means and a normally closed valve, said normally closed valve allowing flow of the fluid to said valve control means only when actuated, said normally closed valve being selectively actuated by said timing means for a predetermined time.

15. The system of claim 7 wherein said helix is responsive to current, said helix regulating the temperature of the fluid passing therethrough in response to electrical current supplied thereto, and wherein said temperature control means also includes: sensing means to sense the temperature of the fluid after it passes through said helix, and current control means responsive to said sensing means for applying current to said helix, said current control means controlling the current in response to said sensing means.

16. The system of claim 13 wherein said helix is responsive to current, said helix regulating the temperature of the fluid passing therethrough in response to electrical current supplied thereto, and wherein said temperature control means also includes: sensing means to sense the temperature of the fluid after it passes through said helix, and current control means responsive to said sensing means for applying current to said helix, said current control means controlling the current in response to said sensing means.

17. A temperature control system comprising:
a supply means for supplying fluid, the fluid being a cryogenic liquid, the fluid acting as a temperature effecting agent for the temperature control system;
an outlet;
fluid conveying means for conveying the fluid from said supply means to said outlet;
temperature control means for regulating temperature of the fluid at said outlet, said temperature control means including a helix of electrically resistant tubing, said helix being connected to said fluid conveying means in fluid conveying relation such that the fluid passes through said helix;
fluid control means for regulating flow of the fluid through said fluid conveying means, said fluid control means including a metering valve and a solenoid valve; and
distribution network means for governing efflux of the fluid from the system such that the fluid is uniformly distributed in a desired area, said distribution network means including at least one tube, said distribution network means being connected to said outlet in fluid conveying relation such that the fluid passes from said outlet into said distribution network means with the fluid passing into said distribution network means flowing into said at least one tube, said tube having a plurality of aperatures for efflux of the fluid from the system.

18. The system of claim 17 also including means for converting the cryogenic liquid to a gas and timing means for selectively actuating said solenoid valve.

* * * * *